United States Patent [19]
Botterill

[11] Patent Number: 4,950,214
[45] Date of Patent: Aug. 21, 1990

[54] DIFFERENTIAL DRIVE

[75] Inventor: John Botterill, Saarbrücken, Fed. Rep. of Germany

[73] Assignee: Uni-Cardan AG, Siegburg, Fed. Rep. of Germany

[21] Appl. No.: 392,575

[22] Filed: Aug. 10, 1989

Related U.S. Application Data

[63] Continuation-in-part of Ser. No. 348,564, May 5, 1989.

[30] Foreign Application Priority Data

May 5, 1988 [DE] Fed. Rep. of Germany ....... 3815225
Mar. 20, 1989 [DE] Fed. Rep. of Germany ....... 3909112

[51] Int. Cl.$^5$ .............................................. F16H 1/44
[52] U.S. Cl. .................................................... 475/231
[58] Field of Search ....................... 74/710.5, 711, 713

[56] References Cited

U.S. PATENT DOCUMENTS

| | | | |
|---|---|---|---|
| 4,679,463 | 7/1987 | Ozaki et al. | 74/710.5 X |
| 4,741,407 | 5/1988 | Torii et al. | 74/710.5 X |
| 4,805,486 | 2/1989 | Hagiwara et al. | 74/710.5 |
| 4,811,628 | 3/1989 | Winkam et al. | 74/710.5 |

FOREIGN PATENT DOCUMENTS

| | | | |
|---|---|---|---|
| 3444843 | 6/1986 | Fed. Rep. of Germany | 74/711 |
| 82048 | 4/1986 | Japan | 74/711 |
| 175338 | 8/1986 | Japan | 74/711 |
| 266850 | 11/1986 | Japan | 74/711 |

Primary Examiner—Dwight Diehl
Attorney, Agent, or Firm—Toren, McGeady & Associates

[57] ABSTRACT

The present invention relates to an externally controlled lockable differential drive with the load application on its friction assembly being effected via a selectively actuatable rotary drive via a pressure ring. For this purpose, there is provided an actuating ring which is drivable by an electric motor via a pinion and which effects an axial adjustment of the pressure ring. The pressure ring itself cannot be rotatable relative to the housing. End faces of the pressure ring and the actuating ring which face each other are provided with control curves or profiles, which together with interplaced rolling elements, as necessary, displace the pressure ring upon rotation of the actuating ring, and can feature a nonlinear rate of change of the axial component acting on the pressure ring as a function of the angle of rotation of the actuating ring.

17 Claims, 10 Drawing Sheets

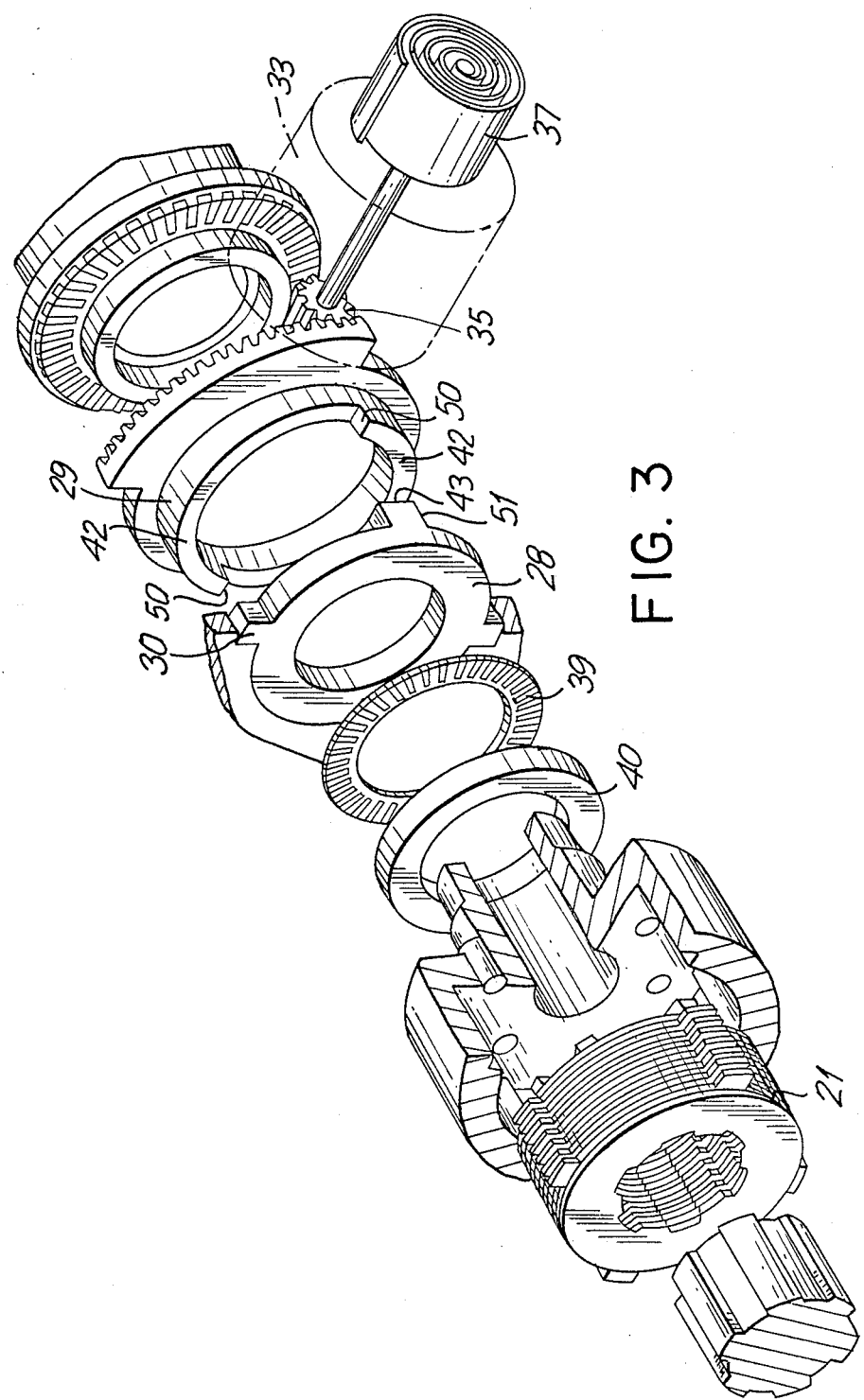

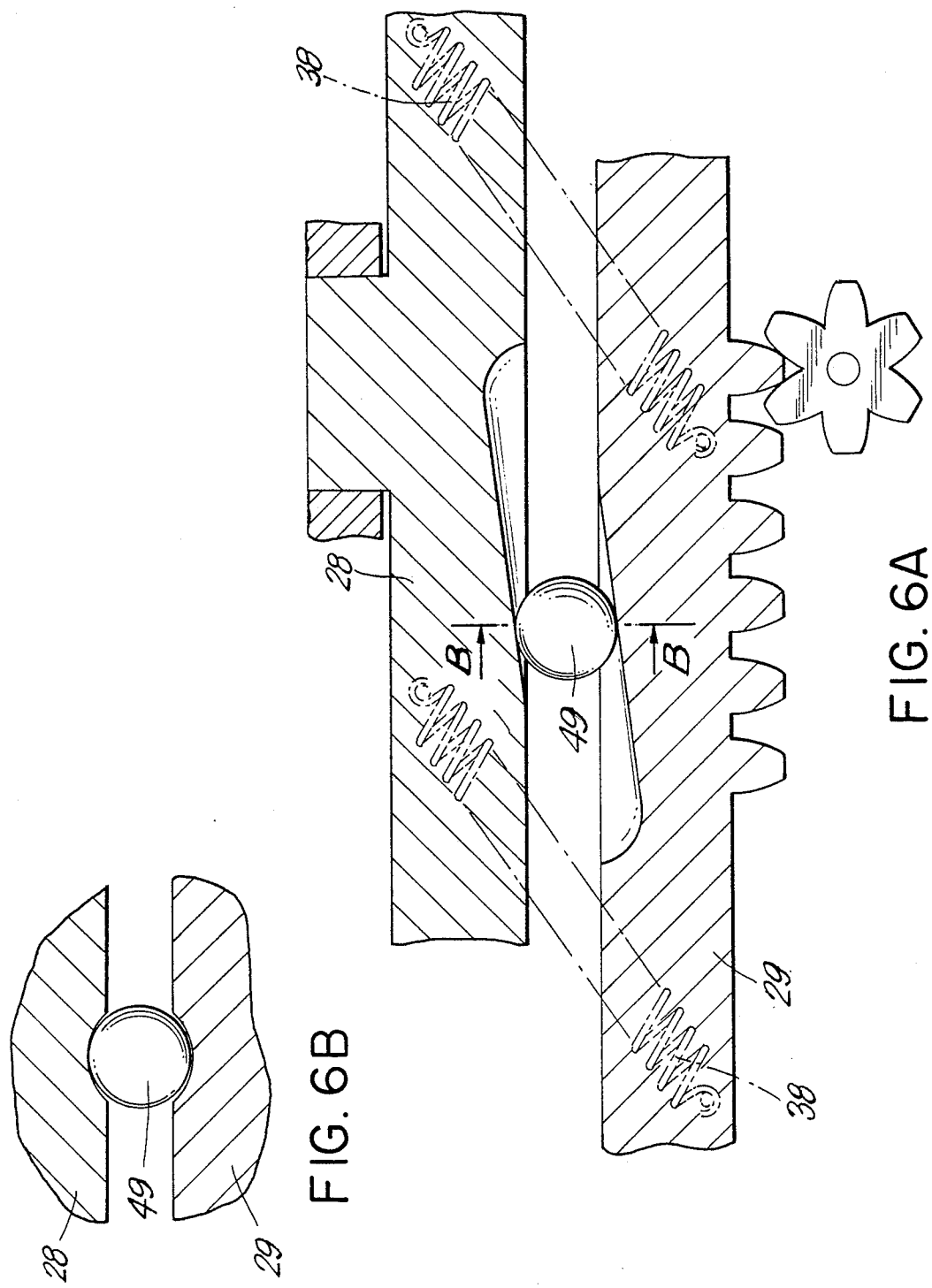

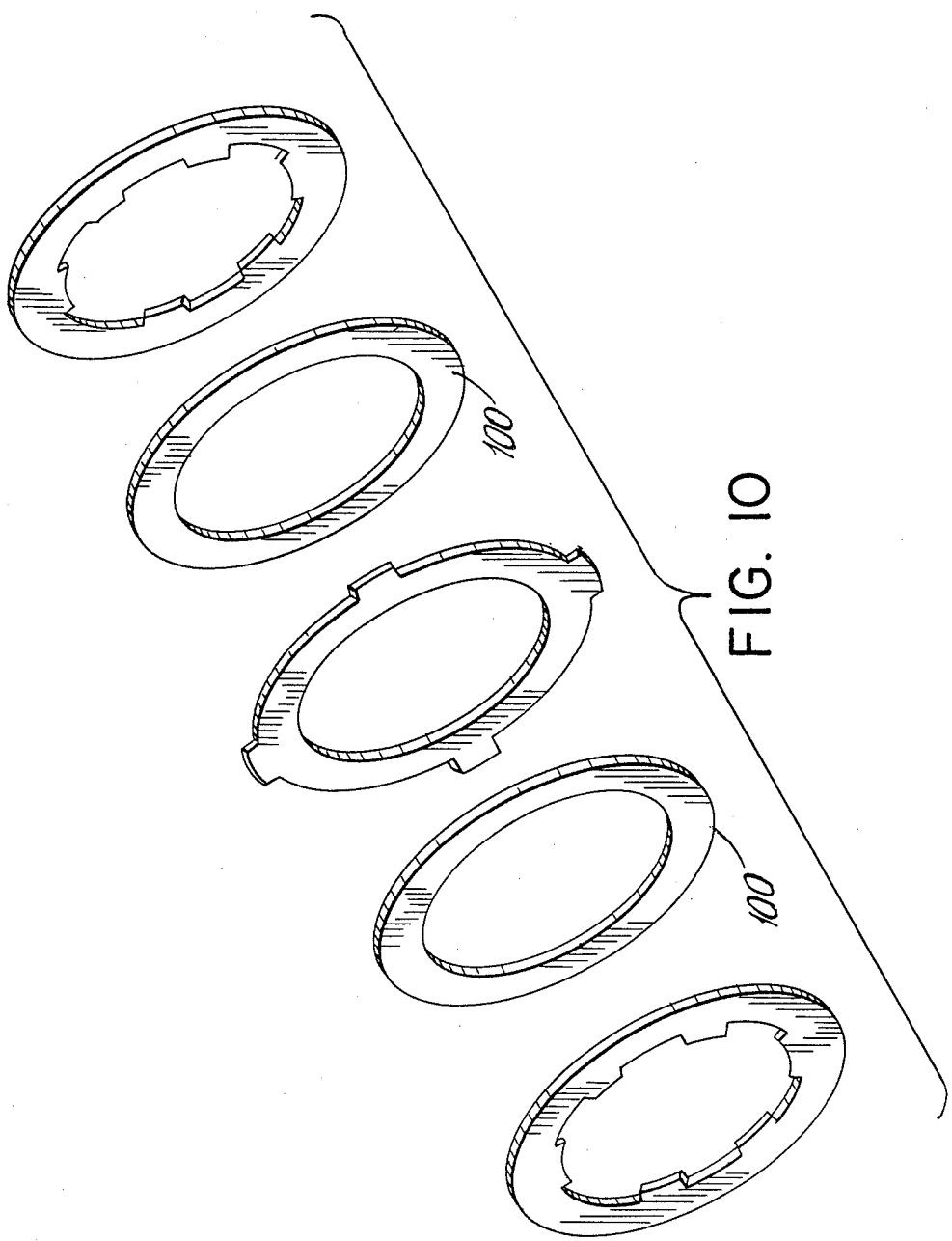

DIFFERENTIAL DRIVE

The present application is a continuation-in-part of application Ser. No. 348,564 filed May 5, 1989.

FIELD AND BACKGROUND OF THE INVENTION

The present invention relates to a differential drive with an externally variable controllable locking coupling, especially for motor vehicles, having a drivable differential carrier rotatably supported in a housing, output gears arranged coaxial and retatable relative to the differential carrier and non-rotatable relative to their respective output shafts, further having differential gears simultaneously engaging the output gears and rotatably held in the differential carrier, as well as a friction assembly alternately comprising outer plates nonrotatingly connected to a first of the coaxially positioned parts (differential carrier and output gears) and inner plates nonrotatingly connected to another of the coaxially positioned parts (differential carrier and output gears), with these on the one hand being axially supported on a supporting face of the first of the parts (differential carrier or one of the output gears) and, on the other hand, being loadable via an actuating device and a pressure plate.

There are prior art externally controlled, lockable differential drive, in the case of which the friction assembly is loaded via hydraulic cylinders. These are integrated into the differential drive. Admittedly, this method of actuating lockable differential drives is relatively advantageous from the point of view of functioning and behavior, but the hydraulic components make it expensive. This applies even in those cases where a hydraulic system is already available for the power steering and suspension systems.

Furthermore, electromagnetic methods of actuating the friction assembly of a lockable differential drive have been proposed (DE-OS 37 07 115). However, the disadvantage of such an assembly is that a mechanical transmission between the coil and the friction plates achieves an acceptable locking effect within only a narrow wear range of the plates. This is due to the greatly decreasing actuating force of the coil if it does not remain in its optimum position relative to the armature.

There is a further prior art differential drive in the case of which a friction plate assembly is actuated electromagnetically (DE-OS 37 33 771). Its achievable locking effect is not high enough for it to be used as an axle differential and its design is too bulky for this purpose.

Finally, a design using an electric motor together with a reduction gearing system and/or expander plates working against a friction assembly comprising outer and inner plates is known (U.S. Pat. No. 4,805,486). This suffers from two technical disadvantages. Most importantly, the expander system is self-locking which prevents the friction assembly from unloading should there be an electrical failure when the system is locked up. This could give rise to a dangerous vehicle stability condition when the vehicle is moving. Secondly, simultaneous axial displacement and rotation of the gearing between expander plate and driving pinion can create additional friction and hysteresis in the modulation of the friction disc assembly by the actuating device.

SUMMARY OF THE INVENTION

It is therefore an object of the present invention to provide a lockable differential drive which can be controlled by external means, has small dimensions and can be produced at lower costs than the prior art externally controlled lockable differentials.

In accordance with the invention, the objective is achieved in that the actuating device comprises a pressure ring which is nonrotating relative to the housing, but axially movable towards the friction assembly, an actuating ring which is rotatable relative thereto, but held axially immovably and moving the pressure ring, as well as a rotary drive driving the actuating ring if required.

The advantage of this design is that rotary drives are usually cheaper to produce than directly axially-acting power drives, such as hydraulic cylinders. Furthermore, through the pressure ring and the actuating ring, a force redirection and reduction in ratio are achieved, permitting a further reduction in dimensions and thus in the space required.

The rotary drive preferably comprises at least a single-step reduction gear and a motor. In a particularly favorable embodiment, the latter is designed as an electric motor. Furthermore, selection of an electric motor makes it particularly advantageous to provide control means for the actuating system. Because of the inclusion of an intermediate reduction gear, the electric motor is small in size. For a reaction time of 150 ms, with a ratio of 1:50 and a ramp angle of 1.5°, it is sufficient to provide performance values in the range of up to approximately 250 watts for large passenger cars.

According to a further feature of the invention, in order to form a step for the reduction gear, the adjusting ring, at its radially outer portion, has been provided with teeth which are engaged by a toothed pinion.

In this way, it is quite easy to arrange for the motor to be outside the drive housing.

As a result, the connections for the motor are easily accessible.

The ratio of the reduction gear can extend up to 100:1.

Finally, it has been proposed that the rotational movement of the actuating ring, should cover a circumferential path of less than 180°, i.e., only a small rotation is required, so that the required reaction time between the actuation of the motor and the reaction of the locking differential can be achieved, within the reduction gear contemplated.

To meet the requirements of an anti-lock system for the brake it is necessary to ensure short release times of approximately 100 ms. These can be achieved by changing the polarity of the motor and using reverse drive.

However, in order to ensure a return movement of the friction assembly in the sense of relieving the load, if, due to a power failure, the motor is no longer able to do this, a return movement may be effected by one or several return springs. These springs may be designated as tension springs, and it is possible to arrange for several tension springs between the pressure ring and the adjusting ring. However, it is also possible to provide one or several spiral springs which should preferably be arranged directly on the motor shaft.

Finally, according to a further feature of the invention, the motor or the first reduction step of the reduction gear, is connected via a switchable free-wheeling unit to the reduction step of the reduction gear driving the actuating ring, which free-wheeling unit, upon actuation of the motor, ensures locking in the sense of a pressure application and which, upon discontinuation of the actuation of the motor, disconnects the reduction gear from the motor to permit the return movement.

With such a design, it may even be sufficient to design the motor in such a way that it rotates in one direction only, i.e., not to reverse switch it and to effect the return of the actuating ring relative to the pressure ring via the rotationally effective return spring if required.

As the pressure disc is stationary relative to the differential carrier, it is proposed that the pressure ring should act on the friction plates via an axial thrust bearing, and an adjacent pressure disc and followers. The latter are guided axially in the differential carrier and rest againt the pressure plate. This results in a further reduction in friction and a reduction in the amount of force required.

As a first possibility for achieving the axial movement as a result of the rotary movement of the actuator ring, it is proposed in a further embodiment of the invention to design the actuator ring as a disc with ramp faces rising at the end face in the circumferential direction and to design the pressure ring, at its end face, as a follower disc with corresponding cams.

In a preferred embodiment, two or several, preferably three, circumferentially distributed cams or ramps are provided. In order to ensure advantageous friction conditions, friction pairing is selected in respect of the ramp faces and the cams of the actuator ring and pressure ring, such as it can be achieved, for example, by pairing steel and bronze or steel and fiber-reinforced plastics.

As an alternative, it is also conceivable to design the actuator ring as a nut and to provide the pressure ring with a threaded spindle. A reversed design of the two parts is also possible.

As a further alternative, it is proposed to convert the rotary movement into an axial movement by providing the end faces of the actuator ring and pressure ring facing each other with recesses which are disposed opposite each other in pairs and which, while extending in opposite directions, are designed to rise circumferentially from their lowest points to the end faces, with each pair of recesses receiving between their two parts a rolling member, especially a ball. In this way, the friction conditions are favorably influenced.

In a preferred embodiment, at least three such pairs of recesses and thus three rolling members are distributed across the circumference. The lowest point of the recesses in conjunction with the ball serves as a stop for limiting the return movement of the actuating ring relative to the pressure ring.

A rotary drive reacting particularly advantageously and being particularly sensitive to control is achieved in that the control curves or profiles on the end faces of the pressure ring and the actuator ring facing each other which, on rotation of the actuator ring and through the interplaced rolling elements, as necessary, displace the pressure ring axially, have initially a nonlinear rate of change as a function of the angle of rotation of the actuating ring. The effect as intended by the invention ensures that, during the first phase of actuation, due to a steep increase in the effective axial component, a high expansion rate may be achieved between the actuating ring and pressure ring as long as, due to the play between the plates, no reaction forces or no significant reaction forces are to be overcome. The initially steep increase in the effective axial component therefore improves the reaction of the locking coupling. Thereafter, the rate of increase in the effective axial component should preferably decrease progressively until the required rate for the operating range of the locking effect has been reached. The curved of the above change in increase may be expressed mathematically by $$\frac{dy}{dx} = \frac{a}{x} \text{ or } \frac{dy}{dx} = b - ax$$

with y being the axially effective change in height of the ball recess or ramp face and x being the corresponding path in the circumferential direction in the ball recess or on the ramp face. A profile is obtained in accordance with $$y = a \ln x + b \text{ or } y = bx - \frac{ax^2}{2} + c.$$

Now the initial and final slopes have to be determined. For ball recesses, a starting angle of 6-9° and a run-out angle of 1-1.5° is adequate. Within the operating range, the above-mentioned run-out angle is constant as far as the end of the track. This ensures that for all wear conditions, the lock is actuated in the oparating range in accordance with the same characteristic.

According to a preferred embodiment of the invention, an annular or disc-shaped ball cage is provided which constrains the balls in axial holes or radial slots so that all balls run synchronously in the ball tracks using a variable gradient.

According to a first advantageous design, all tracks are provided as control curves in at least one of the end faces in which balls supported on the opposite end face run. While the radius remains constant, a change in the ball track depth at the above-described varying rates is possible.

According to a second advantageous embodiment, the rate of change in depth over the length of the ball tracks is kept constant, but the ball tracks describe an increasing inward radial component so that, as a function of the angle of rotation of the actuator ring, the axial displacement rate decreases progressively. Of course, it is also possible to combine the two embodiments described here. It is also conceivable to provide oppositely extending ball tracks in the two end faces. Preferably, three such pairs of tracks and, thus, three rolling members are disposed around the circumference. The lowest point of the tracks in contact with the ball acts as a stop to limit the return movement of the actuating ring relative to the pressure ring.

The said tracks are especially easy to produce on numerically controlled milling machines. In the case of large production batches, both actuating rings and pressure rings may be produced by sintering or forming with the required accuracy without there being any need for subsequent machining. In this case too, the more complicated control curves do not cause any extra costs.

The preferred embodiments of the invention and the drive concept being used with a lockable differential bevel gear drive in a rear wheel drive vehicle are schematically illustrated in the drawings.

The various features of novelty which characterize the invention are pointed out together with the claims annexed to and forming a part of this disclosure. For a better understanding of the invention, its operating advantages and specific objects attained by its use, reference should be made to the drawings and descriptive matter in which there are illustrated and described the preferred embodiments of the invention.

BRIEF DESCRIPTION OF THE DRAWINGS

In the drawings:

FIG. 3 is an exploded view of the essential parts involved in the embodiment of FIG. 2;

FIG. 6A is a detailed view of the embodiment of FIG. 4 with load applied to the friction assembly;

FIG. 6B is a section taken along the line B—B in FIG. 6A;

FIG. 10 shows an arrangement having freely rotating intermediate discs.

DESCRIPTION OF THE PREFERRED EMBODIMENTS

Figure 1:
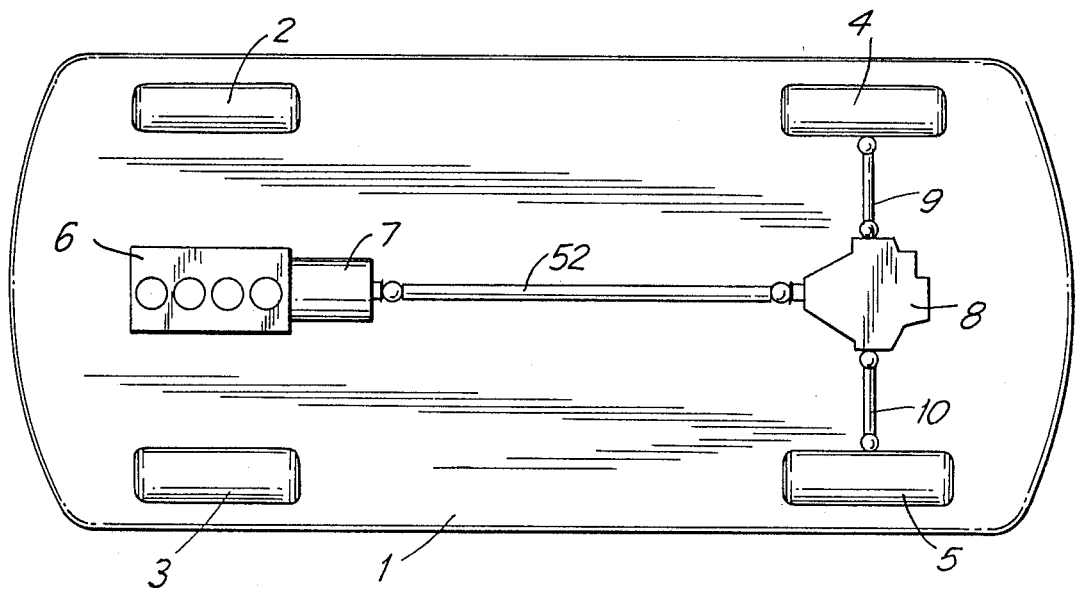
FIG. 1 illustrates a drive concept for a rear wheel drive vehicle.

The vehicle 1 shown in FIG. 1 is a rear wheel drive vehicle. Only the outlines are shown. The vehicle 1 comprises the two front wheels 2 and 3 as well as rear wheels 4 and 5. The two rear wheels 4 and 5 are driven by an engine 6 via a gearbox 7, a propeller shaft 52, an externally controlled lockable differential bevel gear drive 8 connected thereto and drive shafts 9, 10 connected thereto.

Figure 2:
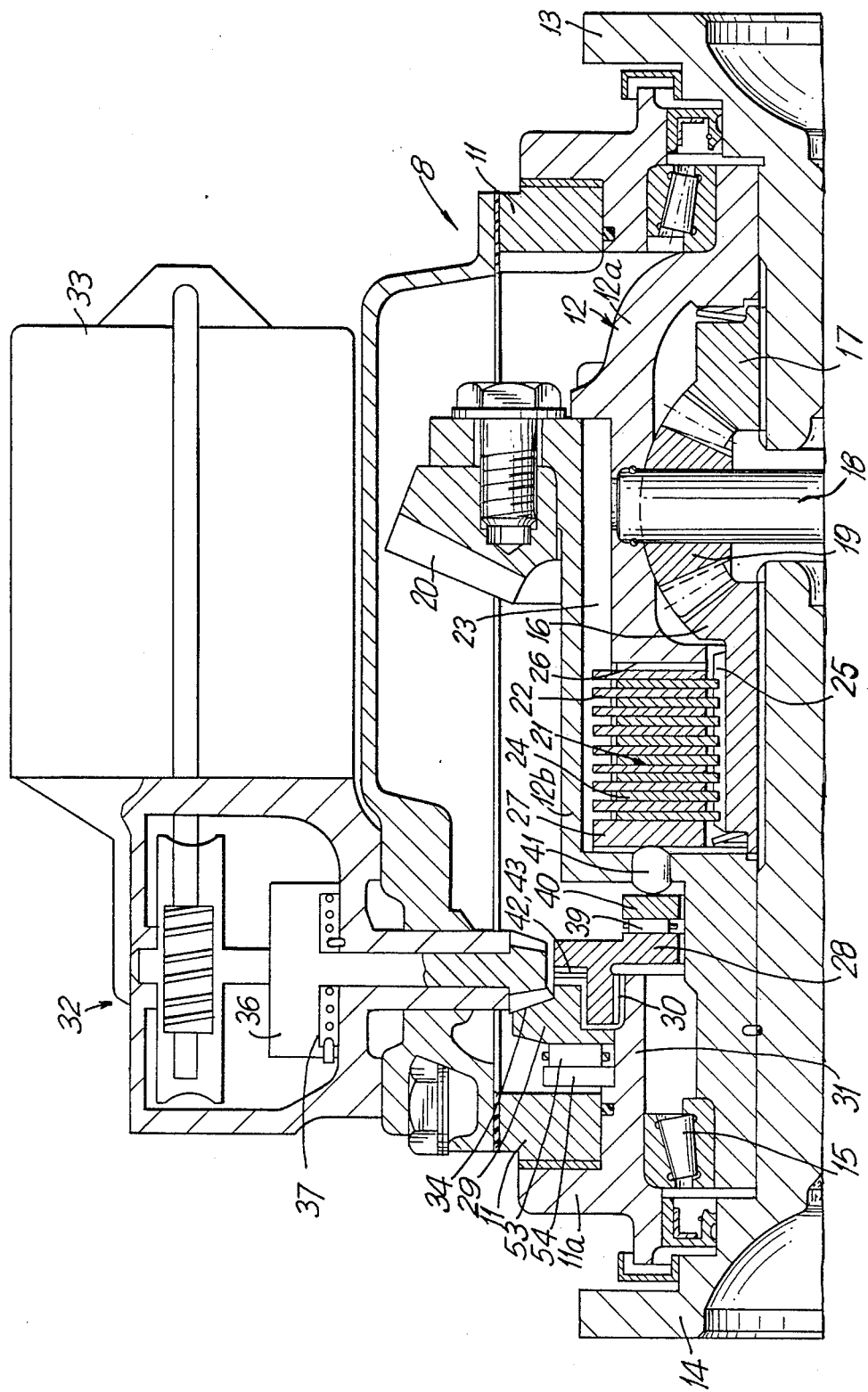
FIG. 2 is a cross section through a differential drive in accordance with the invention, having cam discs and cam follower discs for converting the rotary movement into an axial movement.

The externally controlled, lockable differential bevel gear drive 8 is shown in more detail in FIG. 2. A differential carrier 12 is rotatably arranged via bearings 15 in the housing 11 and the bearing support 11a connected thereto. The differential carrier 12 has a divided design and comprises a first part 12a receiving a first output bevel gear 17 and a second output bevel gear 16 which engage differential belvel gears 19 rotatably supported on a carrier 18 which is designed as a shaft and which is accommodated in part 12a of the differential carrier 12 so as to be rotatable with it. A second part 12b of the differential carrier 12 is nonrotatingly connected to the first portion 12a. It serves to receive a friction assembly 21. Furthermore, one flange face of the differential carrier part 12b is connected to a crown wheel 20 by which the differential carrier 12 is driven by an engine 6 of the vehicle 1. Output bevel gears 16, 17 include splined bores in which, for example, stub shafts 13, 14 may be inserted providing a connection with the drive shafts 9, 10 and to the rear wheels 4, 5. However, it is also conceivable for the joints associated with the drive shafts 9, 10 to be provided with corresponding stub shafts which may be assembled directly into the bores of the output bevel gears 16, 17. The two output bevel gears 16, 17 are rotatably mounted in the differential carrier 12. A friction assembly 21 consisting of the outer plates 22 and the inner plates 24 has also been provided. The bores of the inner plates 24 have been provided with splines by means of which they are nonrotatingly, but axially slideable on corresponding outer splines 25 of a projection on the output bevel gear 16. The outer circumference of the outer plates 22 arranged between two inner plates 24 has also been provided with projections which nonrotatingly engage corresponding groove or slots 23 provided in the differential carrier 12, or rather, in its second part, 12b. The outer plates 22 are also slideable in the axial direction. The friction assembly 21, on the one hand, is axially supported on a supporting face 26 forming part of the first part 12a of the differential carrier 12 and, on the other hand, the friction assembly 21 may be pressurized via a pressure plate 27. Furthermore, followers 41 which pass through the second part 12b of the differential carrier 12 and against which a thrust plate 40 arranged outside the differential carrier 12 rests, have been provided.

In the region of the followers 41, the second part 12b of the differential carrier has been provided with a radially extending face.

The application of load to the friction assembly 21 for the purpose of braking the output bevel gear 16 relative to the differential carrier 12 is described below, first with reference to FIGS. 2 and 3.

A pressure ring 28 is nonrotatingly, but axially movably arranged on a bearing support projection 31 in the bearing support 11a of the housing 11. For this purpose, the bearing support projection 31 has been provided with splines 30 on which the pressure ring 28 is guided with corresponding splines 30 provided in a bore of its projection. In this way, a nonrotating connection between the pressure ring 28 and the support 11a of the housing 11 is achieved, while simultaneously permitting axial displacement in the direction of the friction assembly 21 due to the splines 30. Between a radial face of the pressure ring 28 and a thrust plate 40, there has been provided an axial thrust bearing 39, thereby reducing the friction because the thrust plate 40 rotates with the differential carrier 12. Furthermore, an actuating ring 29, rotatably but axially constrained, is arranged on the bearing support projection 31. The actuating ring 29 is supported against an axial thrust bearing consisting of the race 53 and a supporting ring 54. The adjusting ring 29 and the pressure ring 28 embody radially extending end regions arranged opposite each other. With the embodiment illustrated in FIGS. 2 and 3, the adjusting ring 29, on its end face facing the pressure ring 28, comprises at least two circumferentially disposed ramp faces 42. The pressure ring 28 comprises two cams 43 which are supported on the ramp faces 42. In the starting condition when the friction assembly 21 is not loaded by an axial force, i.e., when the differential bevel gear drive 8 operates in the open condition, the actuating ring 29 and the pressure ring 28 are immediately adjacent to one another, with the return stop face 51 of the pressure ring 28 resting against the respective return face 50 associated with the ramp face 42. Upon rotation of the actuating ring 29, the ramp face 42 slides relative to the cam face 43 and displaces the pressure ring 28 in the direction of the friction assembly 21 which causes a predetermined locking effect and thus brakes the movement of the output bevel gear 16 to the rotary movement of the differential carrier 12.

To achieve rotary movement, the actuating ring 29 in its radially outer portions has been provided with bevel gear teeth 34 which are engaged by a pinion 35. Via a free-wheeling unit 36, the pinion 35, viewed from a motor 33 designed as an electric motor, is connected to a first reduction step.

Figure 4:
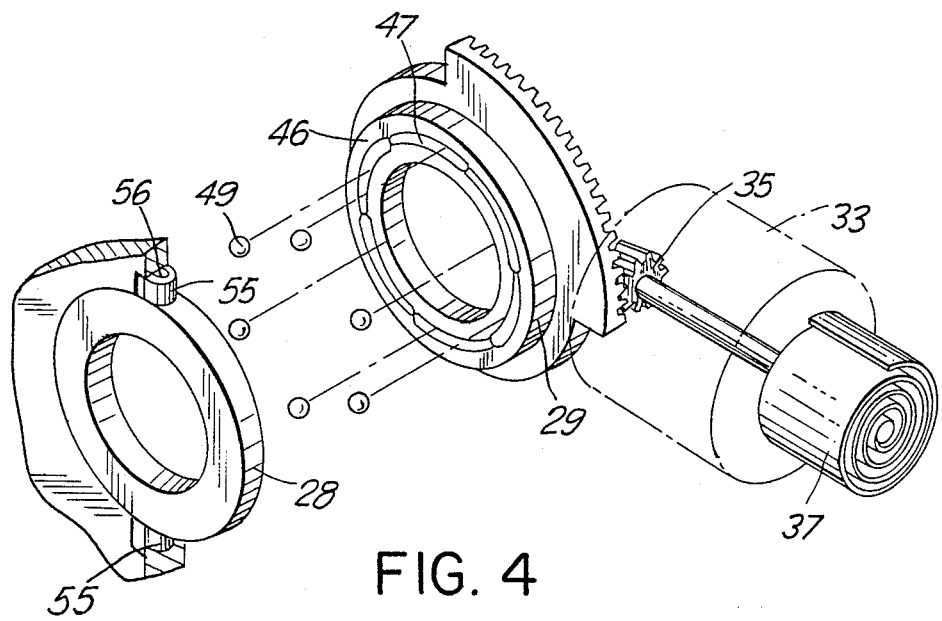
FIG. 4 is an exploded view of a second embodiment with tracks and balls for converting the rotary movement into an axial movement in the positioning of the pressure ring.

Furthermore, between the housing 11 and the shaft associated with the pinion 35 and passing through and out of the housing 11, there has been provided a return spring 37 designed as a spiral spring (FIG. 2). In the case of reversible reduction gears, it may also act on the motor shaft (FIGS. 3 and 4). The return spring 37 sensures that, in case for whatever reason, the motor 33 cannot be supplied with energy and is therefore not in a position to return the actuator ring 29, a reverse rotation is achieved as a result of the spring force. In any case, because the free-wheeling unit 36 has been provided, it may be superfluous to provide a motor which may be actuated in both directions of rotation if the unit 36 is a switchable free-wheeling unit which, upon rotation of the adjusting ring 29 relative to the axial adjustment of the pressure ring 28, locks in the direction of the friction assembly 21 and, in those cases where the motor 33 does not apply a moment to the pinion in the sense of holding it in the locked position, effects a free-wheeling position and thus disconnects the motor 33 from the pinion 35, thereby permitting a return. It may even be possible for the return spring to be eliminated so that the rotating masses of the motor 33 do not have to be moved.

Figure 5:
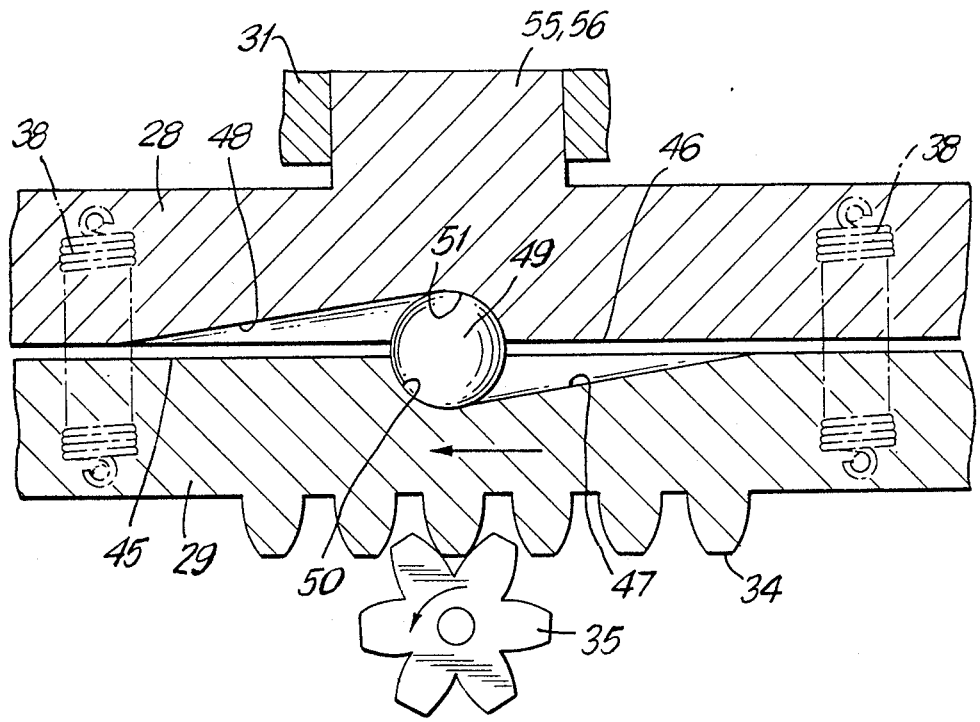
FIG. 5 is a detailed view of the embodiment of FIG. 4 in the stationary unloaded condition.

FIGS. 4 to 7 show in detail a preferred alternate method of actuation. The end face 45 of the adjusting ring 29 comprises several circumferentially distributed ball tracks 47 which, starting from the lowest point designed as a return stop face 50, rise toward the end face 45 with the ball tracks 47 extending in a circular arch. Opposite the ball tracks 47, in the end face 46 of the pressure ring 28, there has been provided a ball track 48 which also, starting from a lowest point intended to be a return stop 51, extends at a gradient in the direction of the end face 46. However, the two ball tracks 47 and 48 extend in opposite directions. Each two ball tracks 47, 48 arranged in pairs opposite each other accommodate a rolling member in the form of a ball 49. When the actuator ring 29 is rotated relative to the pressure ring 28, the ball 49 moves in the ball recesses 47, 48, taking up the position as illustrated in FIGS. 6A and 6B. In the process, the ball 49 causes an expansion in the pressure ring 28 so that it moves away from the actuator ring 29. Furthermore, as can be seen in FIGS. 5 and 6A, tension springs 38 are arranged between the adjusting ring 29 and the pressure ring 28 in the form of return springs. FIG. 6A shows the position of the return springs 38. Preferably, several tension springs should be circumferentially distributed. Equally, several pairs of tracks 47, 48 are distributed around the circumference.

To ensure low-friction axial guidance of the pressure ring 28, there have been provided radially extending rollers 55 on the journals 56 which are guided in corresponding grooves in the bearing support projection 31.

Figure 7:
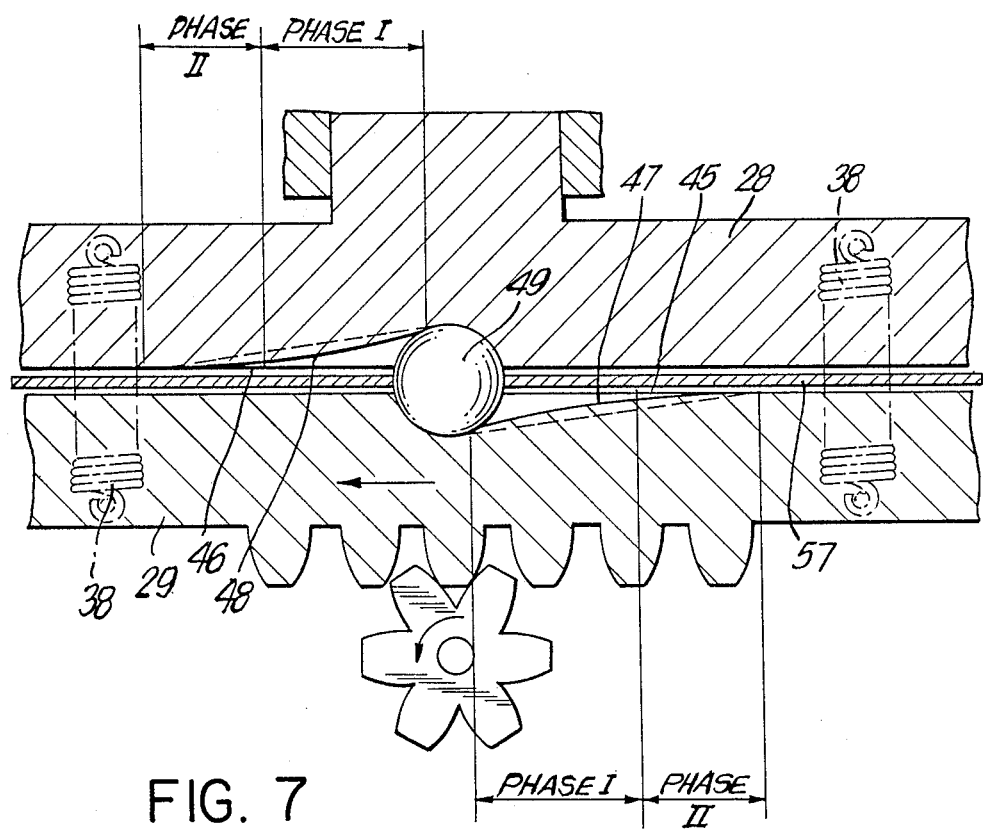
FIG. 7 illustrates a further embodiment of FIG. 5.

FIG. 7, while using the same reference numerals, essentially corresponds in detail to the embodiment illustrated in FIG. 5. However, in this case, the ball tracks 47, 48 have a variable gradient in depth starting from the illustrated nonrotating condition of the pressure ring 28 and the actuator ring 29, showing a phase I with a variable gradient, i.e., a steep rise, with a high expanding rate as a function of the angle of rotation, but with a continuously decreasing gradient and, thus, a decreasing expanding rate as a function of the angle of rotation and, subsequently, a phase II with a constant expanding rate required for expanding under load. The constant gradient is required to cover different load and wear conditions.

Between the pressure ring 28 and the actuator ring 29, there is illustrated a ball cage 57 which holds the balls constantly disposed circumferentially and forces them to rum synchronously which is particularly significant in phase I.

Figure 8:
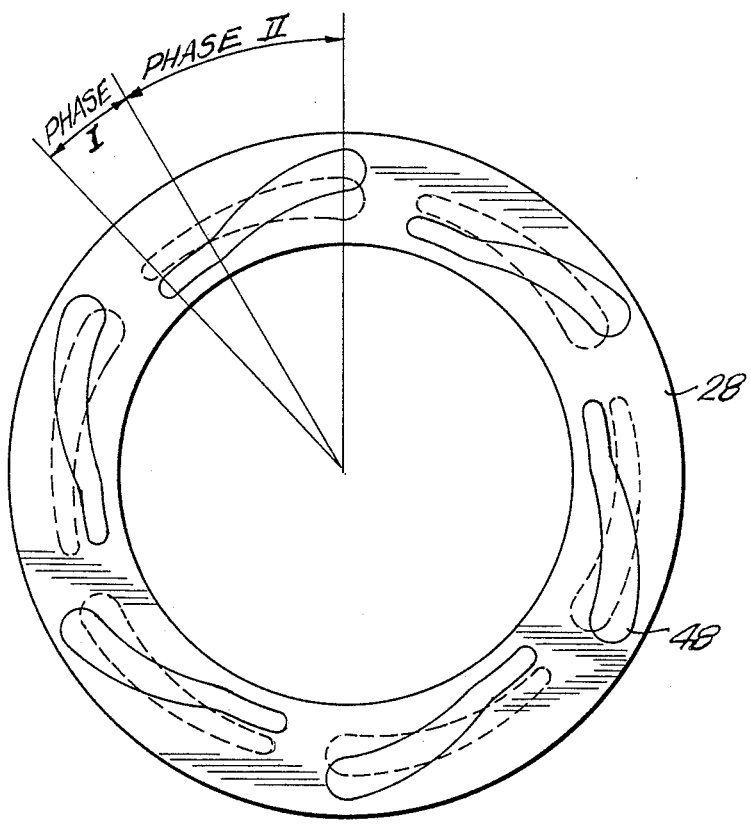
FIG. 8 is a plan view of a pressure or adjusting ring according to FIG. 5 but in another embodiment.

FIG. 8 is a plan view of the pressure ring 28 with an alternate or complementary embodiment, having been provided with six circumferentially distributed ball tracks 48 which, with the same or different gradients with reference to depth, additionally comprise a sector having a radial component in the track length so that the rate of expansion as a function of the angle of rotation is reduced.

Figure 9:
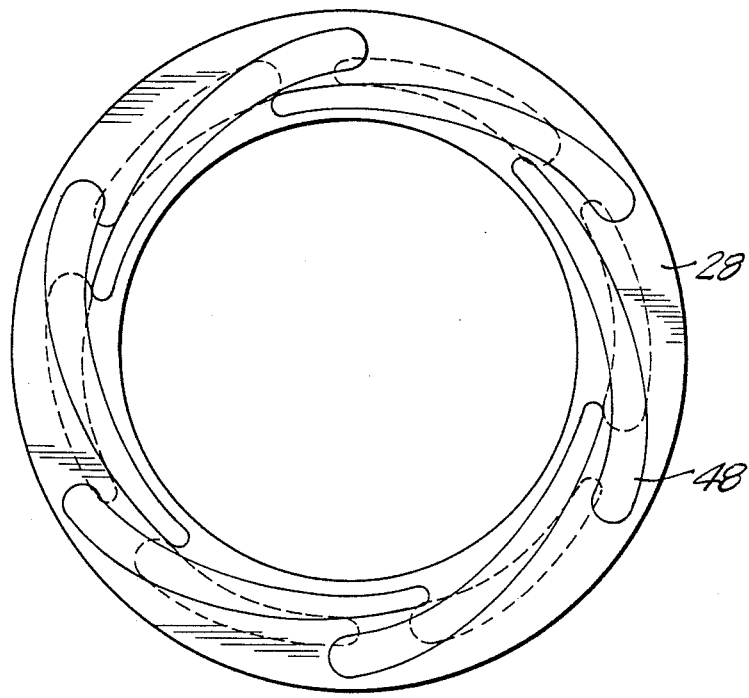
FIG. 9 shows a further embodiment of a pressure and adjusting ring; according to FIG. 8.

The pressure ring 28 illustrated in FIG. 9 is essentially the same as that shown in FIG. 8, but due to the radial component of the ball tracks 48 in phase II, the tracks can overlap in the circumferential direction. As a result of the greater possible angle of rotation, it is possible to achieve a lower rate of gradient.

FIG. 10 illustrates how conventional freely rotatable intermediate discs 100 can be arranged between discs having inner and outer teeth, respectively. These intermediate discs 100 are provided to prevent the occurrence of so-called "stick-slip", as is well known in the art.

While specific embodiments of the invention have been shown and described in detail to illustrate the application of the inventive principles, it will be understood that the invention may be embodied otherwise without departing from such principles.

What is claimed is:

1. A differential drive with an externally variable controllable locking coupling, comprising:
   a housing;
   a drivable differential carrier rotatably supported in the housing;
   two output shafts;
   output gears arranged coaxially and rotatable relative to the differential carrier, and nonrotatably connectable to their respective output shafts;
   differential gears rotatably held in the differential carrier so as to simultaneously engage the output gears; a friction assembly including alternating inner plates nonrotatably connected to a first of the coaxially positioned output gears, and outer plates nonrotatably connected to another of the coaxially positioned output gears or differential carrier and axially supported on a supporting face of a first of the coaxially positioned parts;
   actuating means; and
   a pressure plate, the actuating means and the pressure plate being provided so as to load the rotating discs, the actuating means including a pressure ring provided so as to be nonrotatable relative to the housing, but axially movable towards the friction assembly, an actuating ring provided to be rotatable relative to the pressure ring, constrained axially but with means for axially displacing the pressure ring, and rotary drive means for driving the actuating ring.

2. A differential drive according to claim 1, wherein the rotary drive means includes a reduction gear and a motor.

3. A differential drive according to claim 2, wherein the actuating ring has a radially outer portion with teeth provided so as to be engageable with a toothed pinion.

4. A differential drive according to claim 3, further comprising a switchable free-wheeling unit connected between the motor output or the output from a subsequent reduction step after the motor output and a reduction step of the pinion associated with the actuating ring, the free-wheeling unit being actuatable by the motor so as to lock the friction assembly in a pressure applying manner, and such that upon cessation of motor actuation the free-wheeling unit disconnects the reduction gear from the motor, ensuring the return of the actuating ring.

5. A differential drive according to claim 2, wherein the motor is an electric motor.

6. A differential drive according to claim 1, wherein the actuating ring is rotatable along a circumferential path of less than 180°.

7. A differential drive according to claim 1, further comprising at least one return spring provided to turn the actuating ring back into a starting position relative to the pressure ring.

8. A differential drive according to claim 1, further comprising an axial thrust bearing, an adjacent thrust disc and followers, provided so as to be able to load pressure plate against the outer and inner plates of the friction assembly, the followers being provided to axially pass through the differential carrier so as to press against the pressure plate.

9. A differential drive according to claim 1, wherein either the pressure ring or the actuating ring are formed as a cam disc having ramp faces rising on the end face in a circumferential direction, and the other pressure ring or actuator ring having an end face formed as a follower disc with corresponding cams.

10. A differential drive according to claim 1, wherein the actuatin ring and the pressure ring each have an end face provided recesses or tracks, the end faces of the actuating ring and the pressure ring being arranged to face one another so that the recesses or tracks are arranged in pairs, the recesses extending in opposite directions and being formed to rise circumferentially from lowest points which are positioned immediately facing one another in each ring in the free unloaded position to the associated end face, and further comprising a rolling member provided in each pair of recesses.

11. A differential drive according to claim 10, wherein the rolling member ia a ball.

12. A differential drive according to claim 10, wherein the formed end faces of the pressure ring and the actuating ring which face each other have a nonlinear rate of change of an axial component acting on the pressure ring as a function of the angle of rotation of the actuating ring.

13. A differential drive according to claim 12, wherein the formations of the pressure ring actuating ring end faces have an initially higher and then lower axial rate of change of the axial component acting on the pressure ring as a function of the angle of rotation of the actuating ring.

14. A differential drive according to claim 13, wherein the ball grooves have a radially directional component which varies circumferentially so as to vary the axial rate of change.

15. A differential drive according to claim 14, wherein several identical ball grooves overlap in the circumferential direction on different radii of the end faces.

16. A differential drive according to claim 12, further comprising a ball cage provided between the actuating ring and the pressure ring so as to hold the balls at the same circumferential distance from one another.

17. A differential drive according to claim 1, and further comprising freely rotatable intermediate discs coaxially arranged between the inner plates and the outer plates of the friction assembly.

* * * * *

UNITED STATES PATENT AND TRADEMARK OFFICE
CERTIFICATE OF CORRECTION

PATENT NO. : 4,950,214
DATED     : August 21, 1990
INVENTOR(S) : John R. Botterill It is certified that error appears in the above-identified patent and that said Letters Patent is hereby corrected as shown below:

In the drawings, Fig. 8, the designations "Phase I" and "Phase II" should be reversed, as shown below:

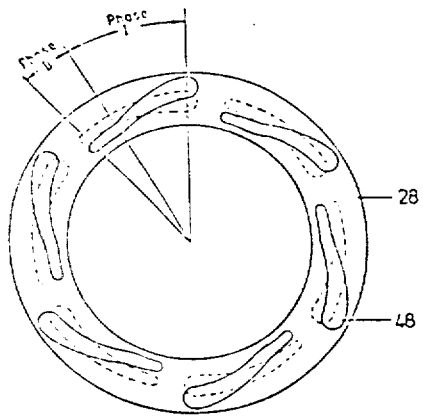

Fig 8

Signed and Sealed this

Twenty-ninth Day of September, 1992

*Attest:*

DOUGLAS B. COMER

*Attesting Officer*     Acting Commissioner of Patents and Trademarks